FRITZ OSTWALD
FRIEDRICH BEUCHLE
DEZSÖ VARGA
Inventors.

FRITZ OSTWALD
FRIEDRICH BEUCHLE
DEZSÖ VARGA
Inventors

FRITZ OSTWALD
FRIEDRICH BEUCHLE
DEZSŐ VARGA
INVENTORS.

United States Patent Office 3,311,386
Patented Mar. 28, 1967

3,311,386
GAS-CUSHION ASSEMBLY FOR VEHICULAR SUSPENSION SYSTEMS
Fritz Ostwald, Buchschlag, and Friedrich Beuchle, Frankfurt am Main, Germany, and Dezsö Varga, Leamington Spa, England, assignors to Alfred Teves Maschinen- und Armaturenfabrik KG, Frankfurt am Main, Germany, a corporation of Germany
Filed Apr. 14, 1965, Ser. No. 459,244
Claims priority, application Germany, Oct. 30, 1964, T 27,327
20 Claims. (Cl. 280—6)

Our present invention relates to a gas-cushion assembly for the suspension systems of wheeled vehicles, especially those of the automotive type in which waste heat is available from an internal-combustion engine.

In such suspension systems, in which the vehicular chassis is supported on its wheel base by pneumatic shock absorbers communicating with a source of high-pressure gas (e.g. air) individual to each wheel or common to some or all of them, it is desirable to regulate the gas pressure so as to compensate for changes in the load of the vehicle in order that, under different operating conditions, there will always be sufficient play for the absorption of vertical impacts.

Earlier proposals to control this gas pressure by selective heating, in response to changes in load, have been only partly successful in view of the difficulty of maintaining a gas temperature which is substantially unaffected by ambient conditions and faithfully follows the load variations.

It is, therefore, an object of our invention to provide an improved gas-cushion assembly of this type in which the desired compensating effect is obtained by means substantially independent of outside temperatures.

A more particular object of this invention is to provide, in an assembly of this character, pressure-regulating means adapted to respond quickly to any load variation without interfering with the normal operation of the assembly in cushioning shocks and vibrations.

A further object of the instant invention is to provide pressure-regulating means adapted to utilize the waste heat of internal-combustion engines as an exclusive source of energy, at least under normal driving conditions.

In accordance with an important feature of our invention we provide a pressure regulator for an air-cushion assembly comprising a manometric device forming a gas space in communication with the gas-cushion assembly so as to be under the same gas pressure as the shock absorber or absorbers to be regulated thereby, the manometric device including a piston displaceable under this gas pressure against a countervailing fluid pressure in an adjacent chamber containing vapors of a vaporizable fluid such as, for example, a fluorinated hydrocarbon (Freon). The vaporizable fluid circulates in a closed system which includes cooling means for condensing it, the resulting condensate being accumulated in a collector and being subsequently reheated in a controlled manner to maintain the proper vapor pressure in the piston chamber. This reheating, according to a more specific feature of our invention, is carried out by a body having an exposed evaporating surface positioned to be flooded by condensate whenever an increase in gas pressure displaces the manometric piston so as to call for a compensating increase in vapor pressure, the piston being advantageously provided with an extension acting as a plunger which enters the condensate collector, or a fluid receptacle in communication therewith, to cause a rise in condensate level increasing the rate of evaporation. The body of the heating device, according to still another feature of the invention, is internally channeled and provided with external conduits leading to the engine of the vehicle for the circulation of hot water from its radiator, hot lubricating oil from its crankcase or some other heating fluid past a thermally conductive wall forming the aforementioned evaporating surface.

The cooling of the vaporized fluid, according to yet another feature of our invention, may be effected in a very simple manner by circulating this fluid through an annular clearance between the inner and outer housing wall surrounding the piston chamber, the outer wall being preferably provided with cooling fins to promote heat exchange with the surrounding atmosphere. Since the alternate heating and cooling of the fluid merely requires temperatures above and below its boiling point, respectively, moderate variations in ambient temperature and/or in the temperature of the heating fluid will have only a negligible effect upon the generated vapor pressure. In order to form a dependable fluidtight seal between the manometric piston and the surrounding housing (e.g. the aforementioned inner wall thereof) we prefer to construct part of the piston as a flexible membrane peripherally attached to the surrounding wall.

Another aspect of our invention relates to the provision of a counterpiston which dips into the pool of collected condensate in the lower part of the housing to help stabilize the level thereof with reference to the horizontal evaporating surface so that just the right amount of fluid is maintained in its vapor phase to counterbalance the excessive gas pressure from the suspension system. The counterpiston advantageously forms a recess accommodating the heater body and communicating with the surrounding pool of condensate, this counterpiston further having a cup-shaped downward extension which constitutes the aforementioned fluid receptacle and opens into the recess through one or more restricted orifices in a tubular projection of the heater body slidably surrounded by this extension. The plunger co-operating with the fluid receptacle depends in this case from the manometric piston, which is spacedly located above the counterpiston within the common housing, and is advantageously guided by a sleeve rising from the heater body. The restricted orifice or orifices, which are normally filled with condensate, exert a certain damping action upon the plunger in the event of rapid oscillations or shocks. Furthermore the counteracting vapor pressure in the piston chamber may be supplemented by resilient restoring means, such as a compression spring centered on the plunger and bearing upon both the piston and the heater body.

Suitable restoring means must also be provided for the counterpiston which is acted upon in a downward direction by the vapor pressure in the piston chamber. According to yet a further feature of our invention, the necessary restoring force is provided by a dead-air space formed between the housing bottom and an overlying partition which has an opening spanned by a flexible membrane, the counterpiston being supported on this membrane so as to be exposed to the pressure of air trapped in that space. If the housing portion surrounding this dead-air space is provided with cooling fins similar to those surrounding the piston chamber, the effect of changes in ambient temperature upon the air above and below the counterpiston will be substantially balanced.

The above and other objects, features and advantages of our invention will become more apparent from the following detailed description, reference being made to the accompanying drawing in which.

Figure 3:
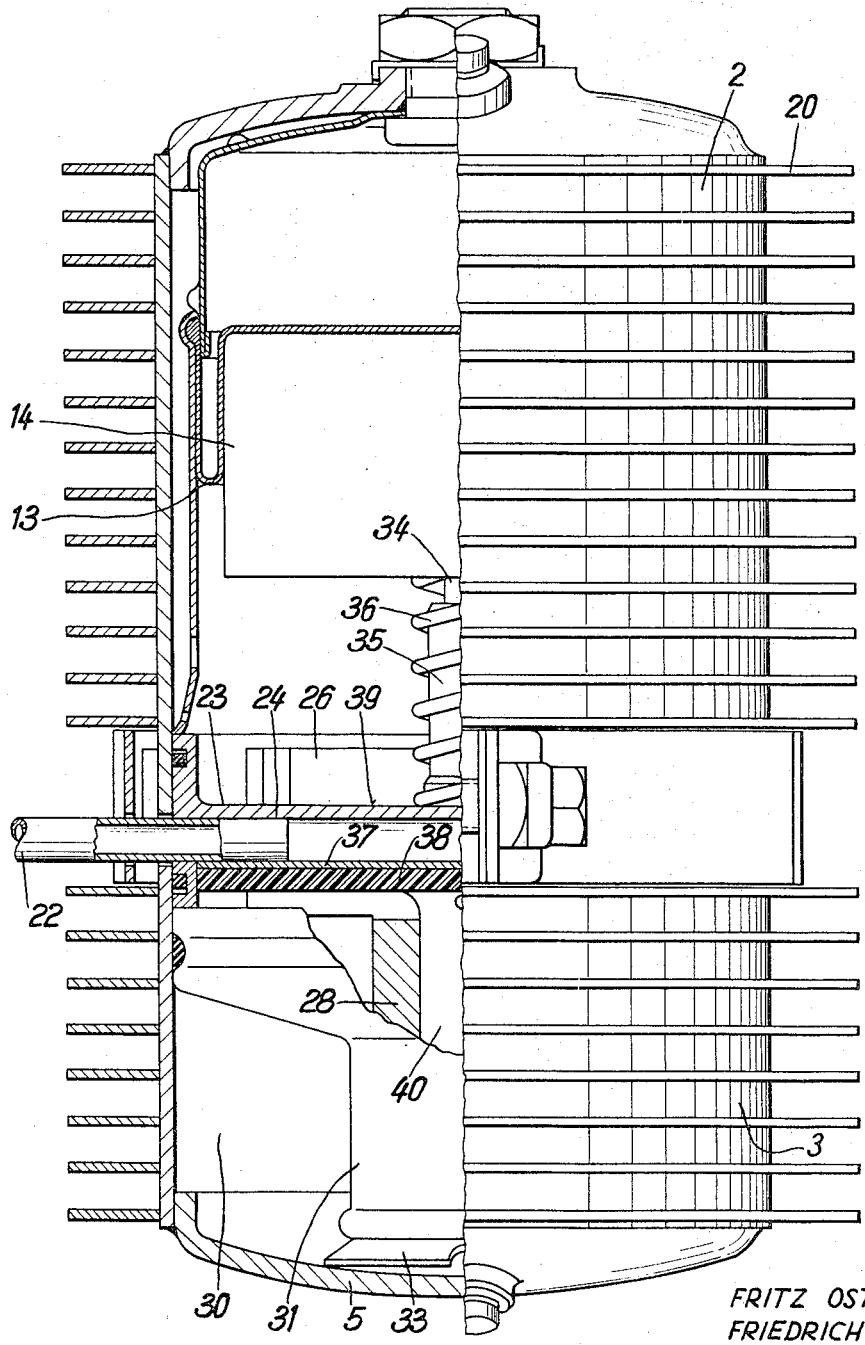
FIG. 3 is another elevational view of the regulator, partly in section taken on line III—III of FIG. 2.
Figure 4:
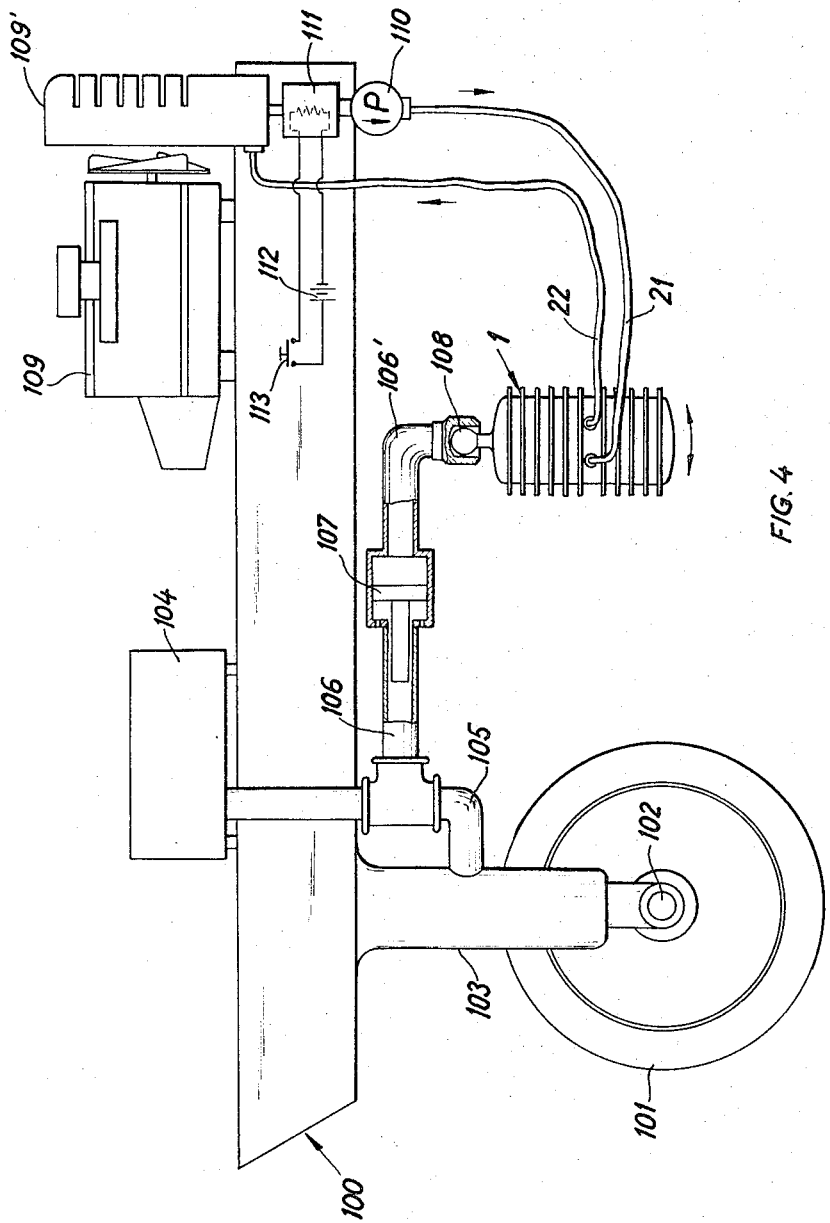
FIG. 4 is a somewhat diagrammatic view of part of an automotive vehicle equipped with one or more shock absorbers of the air-cushion type including a regulator substantially as shown in FIGS. 1–3.

Reference will first be made to FIG. 4 showing the chassis of an automotive vehicle having wheels 101 (only one shown) whose axles 102 support the chassis by way of air-cushion cylinders 103 acting as shock absorbers. These cylinders communicate with a source of high-pressure gas, such as a tank 104, by way of a pipe 105 from which a conduit 106 branches off to apply the pressure of the compressed gas (e.g. air) to a regulator 1 more fully described hereinafter with reference to FIGS. 1–3. Conduit 106 includes a stepped piston 107 which serves to adapt the regulator 1 to the particular suspension system 103–105 of the vehicle.

The housing of regulator 1 contains a vaporizable liquid, such as Freon, whose level is to be critically adjusted with reference to a heating surface in response to pressure changes within conduit 106 and its extension 106' leading to the regulator. In order to make this liquid level substantially independent of horizontal accelerating forces which come into play when the vehicle speeds up, slows down, makes a turn or stands on an incline, the housing of regulator 1 may be suspended from its supply conduit 106' by a universal joint 108, as illustrated in FIG. 4, so as to swing freely in any direction. Conduits 21 and 22, which in the event of such swingable mounting should be flexible, are shown to extend to an element of the vehicle engine 109, here the radiator 109' thereof, which supplies them with heating fluid propelled by a pump 110. Since the water circulated by the pump 110 will become heated only after the engine 109 has been started, an auxiliary heater 111 may be provided in tandem with pump 110 and is shown energizable from a current source 112 (e.g. the vehicular battery) with the aid of a switch 113 which may be thermostatically controlled or manually operated until the engine 109 has developed sufficient waste heat to allow the auxiliary heater 111 to be deactivated.

Figure 1:
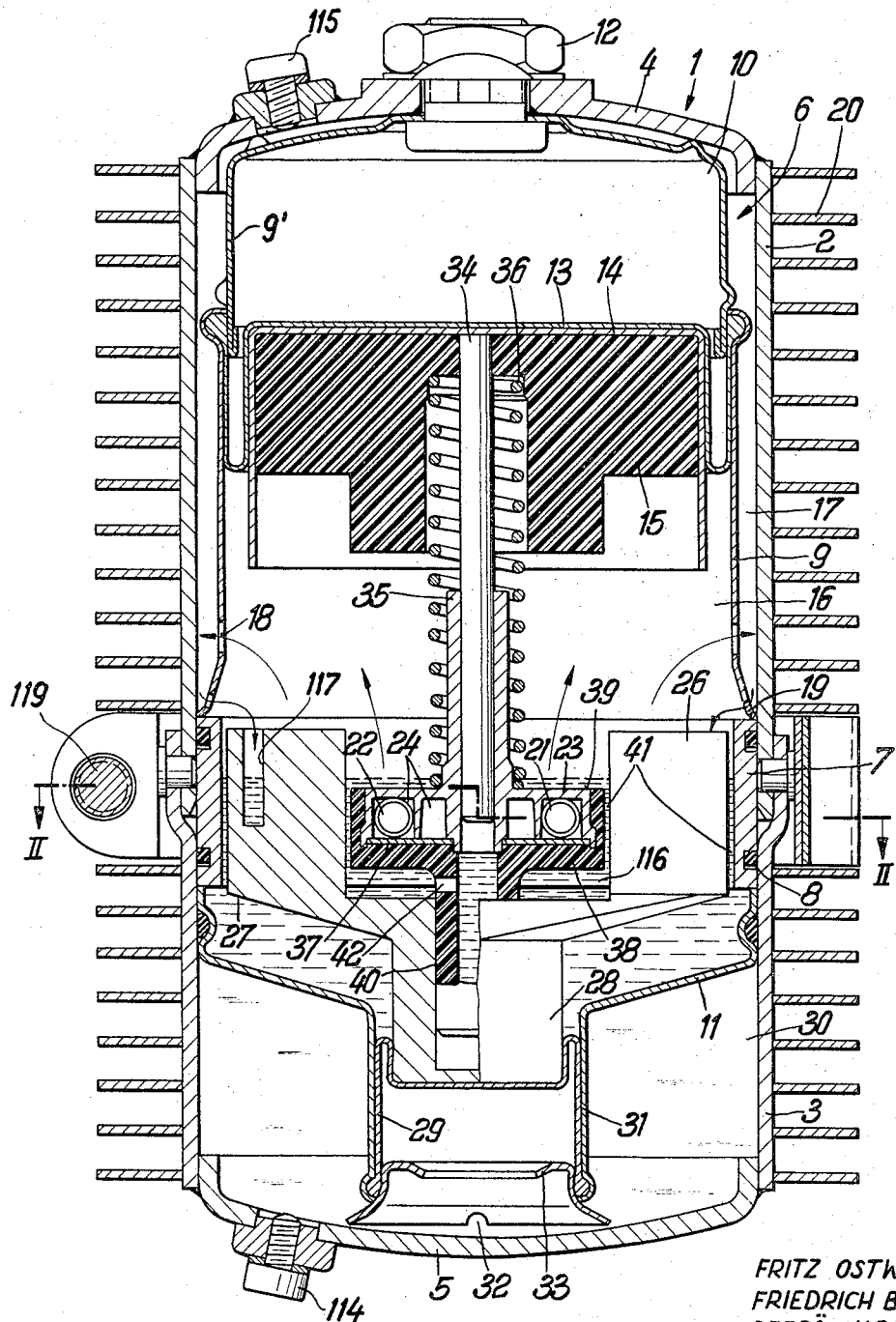
FIG. 1 illustrates, in sectional elevation, a pressure regulator according to our invention.
Figure 2:
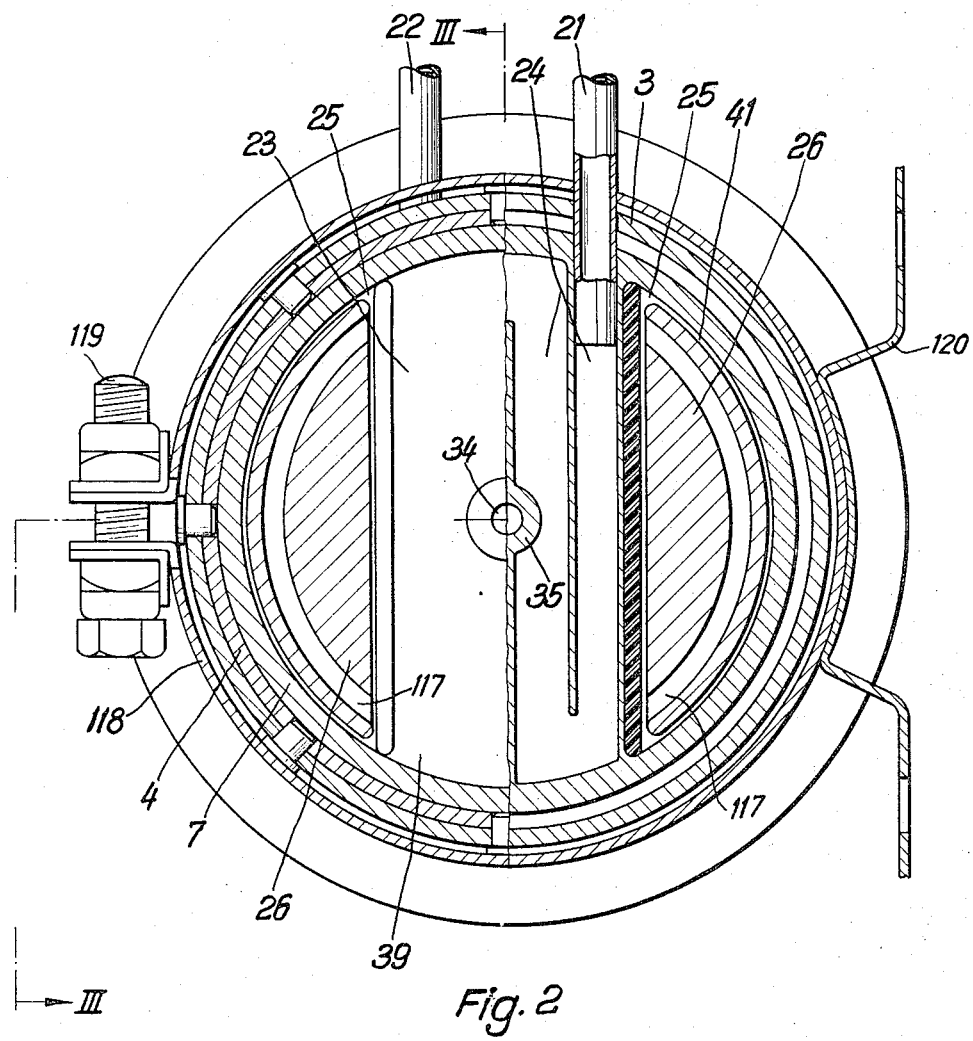
FIG. 2 is a cross-sectional elevational view taken on line II—II of FIG. 1.

As shown in FIGS. 1–3, the regulator 1 comprises an outer housing composed of two cylindrical shells 2, 3 and walls 4, 5 welded thereto.

An inner housing wall 9, coaxially disposed within the upper portion 2 of the outer housing wall, defines therewith an annular clearance 17 communicating with a chamber 16 of variable volume by way of perforations 18 and 19 disposed at two levels in inner wall 9 near the lower end thereof. This lower end abuts a ring 7 which bridges the two shells 2, 3 and is provided with peripheral gaskets 8 to insure a perfect seal. A partition 11 in the lower housing part 3, spaced from the housing bottom 5, defines therewith a dead-air space 30 sealed against the outer atmosphere; this space may be vented, if necessary, by the removal of a screw 114, a similar screw 115 being removable from housing top 4 to give access to clearance 17. A fitting 12, adapted to be connected to a source of high-pressure gas such as the conduit 106' in FIG. 4, opens into the interior 10 of a manometric device 6 formed by an extension 9' of inner housing wall 9, the space 10 being bounded at the bottom by a flexible membrane 13 which forms part of a vertically movable piston also comprising a rigid support composed of a shell 14 and an insert 15.

The entire outer peripheral surface of housing 2, 3 is provided with cooling fins 20, exposed to the outside air, whose purpose is to condense the vapors of a liquid accumulated in and around a counterpiston 27 which is floatingly disposed within ring 7 and dips into a pool of condensate accumulated above partition 11. This counterpiston has a pair of segment-shaped bosses 26 rising with a slight clearance 41 within similarly shaped fluid spaces 25 formed inside ring 7 by a bridge piece 23 which fixedly traverses the ring 7 in diametrical direction and constitutes the heater body of the regulator. This body 23 is internally provided with meandering channels 24 terminating in the conduits 21 and 22 (cf. FIG. 1) for the admission and withdrawal of a heating liquid. The horizontal upper surface 39 of body 23, which consists of metal of good thermal conductivity, acts as a boiling plate and in the normal operation of the regulator is overlain by a shallow layer of the liquid condensate which is thereby continuously evaporated; the vapors, rising into chamber 16, pass outwardly through perforations 18 into the space 17 from which they return in condensed form via perforations 19 to the collector defined by ring 7 and partition 11. The pressure of this vapor, together with the force of a spring 36 bearing upon body 23 and insert 15, thus counteracts the pressure of the gas admitted through fitting 12 to maintain the position of manometric piston 13–15.

The channels 24 are closed at the bottom of body 39 by a sheet-metal plate 37, the structure 23, 27 being enclosed on all sides except at the surface 39 by a plastic sheath 38 of low thermal conductivity. The sheath 38 of heater body 23 is formed with a depending tubular projection or neck 40 having one or more restricted orifices 42 (only one shown) which open into a recess 116 existing between the bosses 26 of counterpiston 27. These bosses are also formed with arcuate grooves 117 communicating with spaces 25 so as to form overflow channels for the liquid condensate present in the recess 116 and to insure the substantially continuous existence of an adequate supply of this liquid to prevent its complete evaporation from surface 39. A sleeve 35, integral with body 23 and coaxial with neck 40, rises toward piston 13–15 and serves as a guide for a plunger 34 slidably received therein, this plunger being secured (e.g. by welding) at its upper end to the piston shell 14 and being coaxially surrounded by the spring 36. Neck 40, in turn, is received with a sliding fit in a cup-shaped lower extension 28 of counterpiston 27, this extension forming a receptacle for the condensate admitted through orifice 42.

The vapor pressure in chamber 16 tends to depress the counterpiston 27 which is elastically supported by air pressure in space 30, this pressure being applied to extension 28 through the intermediary of a flexible membrane 29 spanning an opening defined by a neck 31 of partition 11. An apertured base 33 projects into neck 31 to clamp the membrane 29 firmly thereagainst in order to form a fluidtight seal; base 33 has notches 32 enabling the passing of air between space 30 and the interior of neck 31 below membrane 29.

In FIGS. 1–3 we have shown the regulator housing encircled by a clip 118 which is held together by a bolt 119 and is rigid with a bracket 120 designed to mount the assembly on some part of the vehicular chassis. Naturally, this type of mounting will not be used where, as shown in FIG. 4, the regulator is pivotally or swivelably suspended for the purpose of insuring that, upon the occurrence of horizontal acceleration, the level of the condensate in the region of counterpiston 27 will always be generally perpendicular to the housing axis.

We shall now proceed to describe the operation of the regulator shown in FIGS. 1–3.

It will be assumed that hot liquid is circulating through channels 24 so that surface 39 is heated above the boiling point of the vaporizable fluid whose closed path of circulation has been indicated by the arrows in FIG. 1. Piston 13–15 is in a position of equilibrium in which the gas pressure in space 10 is balanced by the vapor pressure in chamber 16 supplementing the force of restoring spring 36.

If the pressure in space 10 fluctuates sharply about a constant mean value, the resulting oscillations of piston 13–15 will be communicated by the plunger 34 to the counterpiston 27 through the liquid column present between the lower end of the plunger and the closed bottom of receptacle 28; because of the large flow resistance of orifice 42, only a minor amount of liquid will move in or out through the orifice and, in so doing, will exert a certain damping effect upon the oscillations of the piston. The average liquid level in the lower part of the regulator housing remains substantially constant, as does the vapor pressure in chamber 16 whose volume changes only slightly while the counterpiston 27 moves more or less concurrently with manometric piston 13–15.

If a change in the load of the vehicle results in a sustained increase in gas pressure within space 10, piston 13–15 is depressed together with plunger 34 and, as before, bears upon the liquid column in neck 40 and cup 28 so that part of this liquid is forced out through orifice 42 into the surrounding space 116, 25, 117. The resulting rise in the level of the condensate above evaporating surface 39, moderated by the presence of overflow channels 117, brings about an accelerated rate of vaporization augmenting the overall pressure in chamber 16. The increased vapor pressure restores the piston 13–15 to substantially its previous position so that the chassis 100 (FIG. 4) is again elevated to its normal level above the wheel axle 102. At the same time, the overbalancing of the air pressure in space 30 by the vapor pressure in chamber 16 depresses the counterpiston 27 into a new position in which it displaces additional condensate whereby the rate of vaporization is stabilized at a value consistent with the increased vapor pressure now required.

If the load of the vehicle is subsequently lightened, the decreased gas pressure in space 10 causes both pistons 13–15 and 27 to rise, with a resulting drop in the vapor pressure of chamber 16 as the liquid level recedes from surface 39 and evaporation diminishes or stops temporarily. This reduction in vapor pressure again enables the piston 13–15 to return to approximately its previous position, with resulting restoration of the elevation of chassis 100.

We claim:

1. In a vehicle provided with a chassis supported by a gas-cushion assembly on a wheel base, the combination therewith of a pressure regulator for said gas-cushion assembly comprising:
   manometric means forming a gas space in communication with said gas-cushion assembly, said manometric means including a piston displaceable by gas pressure from said assembly;
   a closed circulation system for a vaporizable fluid, said system including a chamber bounded in part by said piston, cooling means for condensing said fluid and collector means for the condensate;
   heating means in said system positioned adjacent said collector means for contact by said condensate;
   and control means for said heating means coupled with said piston for varying the degree of vaporization of said condensate in response to variations in said gas pressure whereby an equilibrium is maintained between said gas pressure and an opposing force exerted upon said piston by vapor pressure in said chamber.

2. In a vehicle provided with a chassis supported by a gas-cushion assembly on a wheel base, the combination therewith of a pressure regulator for said gas-cushion assembly comprising:
   manometric means forming a gas space in communication with said gas-cushion assembly, said manometric means including a piston displaceable by gas pressure from said assembly;
   a closed circulation system for a vaporizable fluid, said system including a chamber bounded in part by said piston, cooling means for condensing said fluid and collector means for the condensate;
   heating means in said system comprising a body having an exposed evaporating surface positioned adjacent said collector means for contact by said condensate;
   and control means for said heating means coupled with said piston for varying the degree of vaporization of said condensate by contact with said surface in response to variations in said gas pressure whereby an equilibrium is maintained between said gas pressure and an opposing force exerted upon said piston by vapor pressure in said chamber.

3. In a vehicle provided with an internal-combustion engine and a chassis supported by a gas-cushion assembly on a wheel base, the combination therewith of a pressure regulator for said gas-cushion assembly comprising:
   manometric means forming a gas space in communication with said gas-cushion assembly, said manometric means including a piston displaceable by gas pressure from said assembly;
   a closed circulation system for a vaporizable fluid, said system including a chamber bounded in part by said piston, cooling means for condensing said fluid and collector means for the condensate;
   heating means in said system comprising a body having an exposed evaporating surface positioned adjacent said collector means for contact by said condensate, said body being provided with conduit means extending to said engine for supplying waste heat thereof to said surface;
   and control means for said heating means coupled with said piston for varying the degree of vaporization of said condensate by contact with said surface in response to variations in said gas pressure whereby an equilibrium is maintained between said gas pressure and an opposing force exerted upon said piston by vapor pressure in said chamber.

4. The combination defined in claim 2, further comprising an auxiliary heat source for said body operable in the cold state of said engine.

5. In a vehicle provided with a chassis supported by a gas-cushion assembly on a wheel base, the combination therewith of a pressure regulator for said gas-cushion assembly comprising:
   manometric means forming a gas space in communication with said gas-cushion assembly, said manometric means including a piston displaceable by gas pressure from said assembly;
   a closed circulation system for a vaporizable fluid, said system including a chamber bounded in part by said piston, cooling means for condensing said fluid and collector means for the condensate;
   heating means in said system comprising a body having an exposed horizontal evaporating surface positioned adjacent said collector means for contact by said condensate, and control means coupled with said piston for varying the degree of vaporization of said concentrate by contact with said surface through relative displacement of said body and the level of said condensate in response to variations in said gas pressure whereby an equilibrium is maintained between said gas pressure and an opposing force exerted upon said piston by vapor pressure in said chamber.

6. The combinatiton defined in claim 5 wherein said circulation system includes a housing partly enclosing said chamber and having said collector means disposed in a lower part thereof, said body being positioned in said power part with said surface extending horizontally above the bottom of said housing.

7. The combination defined in claim 6 wherein said housing has a solid outer wall and a perforated inner wall defining with said outer wall an annular clearance surrounding said chamber, said clearance communicating with said chamber through the perforations of said inner wall for the passage of vapor from said chamber into said clearance for the return of condensate to the bottom of said housing, said cooling means including external fins on said outer wall in the region of said clearance.

8. The combination defined in claim 7 wherein said piston overlies said chamber within said inner wall, the latter being provided with an extension above said piston enclosing said gas space, said outer wall spacedly surrounding said extension for forming therewith a continuation of said clearance, said fins being distributed over substantially the entire external surface of said outer wall.

9. The combination defined in claim 8 wherein said piston is formed in part by a flexible membrane forming a fluid-tight seal across said inner wall.

10. The combination defined in claim 6, further comprising a counterpiston in the lower part of said housing positioned to dip into a pool of condensate collected therein, said counterpiston being downwardly displaceable by the vapor pressure in said chamber and being provided with restoring means tending to lift said counterpiston against said vapor pressure whereby the volume of condensate varies inversely with said vapor pressure.

11. The combination defined in claim 10 wherein said housing is internally provided above its bottom with partition means below said chamber forming an opening spanned by a membrane, said counterpiston being supported by said membrane, said restoring means being at least partly constituted by a dead-air space encompassed between said bottom and said partition means.

12. The combination defined in claim 11 wherein said housing is provided with external cooling fins surrounding both said chamber and said dead-air space.

13. The combination defined in claim 10 wherein said control means comprises a plunger depending from said piston and receptacle means in said lower part aligned with said plunger for receiving the lower end thereof, said receptacle means forming a fluid space communicating with said pool for controlling the level of the condensate in dependence upon the position of said plunger.

14. The combination defined in claim 13 wherein communication between said fluid space and said pool is provided by at least one restricted orifice in a wall of said receptacle means.

15. The combination defined in claim 14 wherein said receptacle means includes a generally cup-shaped extension of said counterpiston.

16. The combination defined in claim 14 wherein said receptacle means further includes a tubular projection on said body slidably surrounded by said cup-shaped extension.

17. The combination defined in claim 16 wherein said orifice is formed in said tubular projection above said cup-shaped downward extension, said counterpiston having a recess surrounding said body and communicating with said orifice.

18. The combination defined in claim 17 wherein said counterpiston is further provided with at least one overflow channel communicating with said recess substantially at the level of said surface.

19. The combination defined in claim 15, further comprising a guide sleeve for said plunger on said body in line with said tubular extension, and spring means anchored to said body and said piston for opposing a lowering of the latter by said gas pressure.

20. The combination defined in claim 6, further comprising universal-joint means connecting said housing with said wheel base for enabling said housing to swing freely in response to horizontal accelerations.

References Cited by the Examiner

UNITED STATES PATENTS 3,183,014   5/1965   Doomernik _____ 280—6

BENJAMIN HERSH, *Primary Examiner.*

M. S. SALES, *Assistant Examiner.*